United States Patent
Snape et al.

(10) Patent No.: US 10,731,560 B2
(45) Date of Patent: Aug. 4, 2020

(54) INTERCOOLED COOLING AIR

(71) Applicant: United Technologies Corporation, Farmington, CT (US)

(72) Inventors: Nathan Snape, Tolland, CT (US); Gabriel L. Suciu, Glastonbury, CT (US); Brian Merry, Andover, CT (US); Jesse M. Chandler, South Windsor, CT (US); Frederick M. Schwarz, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 162 days.

(21) Appl. No.: 15/907,942

(22) Filed: Feb. 28, 2018

(65) Prior Publication Data

US 2018/0187602 A1     Jul. 5, 2018

Related U.S. Application Data

(63) Continuation-in-part of application No. 14/804,534, filed on Jul. 21, 2015, now abandoned, which is a
(Continued)

(51) Int. Cl.
    *F02C 7/143*     (2006.01)
    *F02C 6/08*     (2006.01)
    (Continued)

(52) U.S. Cl.
    CPC ............... *F02C 7/143* (2013.01); *F02C 6/08* (2013.01); *F02C 7/185* (2013.01); *F02C 7/32* (2013.01);
    (Continued)

(58) Field of Classification Search
    CPC .. F02C 7/143; F02C 7/185; F02C 7/32; F02C 6/08; F02C 9/18; F02K 3/06; F01D 11/24;
    (Continued)

(56) References Cited

U.S. PATENT DOCUMENTS

| | | |
|---|---|---|
| 2,692,476 A | 10/1954 | Schaal et al. |
| 3,878,677 A | 4/1975 | Colvin |

(Continued)

FOREIGN PATENT DOCUMENTS

| | | |
|---|---|---|
| DE | 2852057 | 6/1979 |
| EP | 0447886 | 9/1991 |

(Continued)

OTHER PUBLICATIONS

The Extended European Search Report for EP Application No. 19160126.9, dated Jul. 19, 2019.

(Continued)

*Primary Examiner* — Richard A Edgar
*Assistant Examiner* — Joshua R Beebe
(74) *Attorney, Agent, or Firm* — Carlson, Gaskey & Olds, P.C.

(57) ABSTRACT

A gas turbine engine includes a plurality of rotating components housed within a compressor section and a turbine section. A first tap is connected to the compressor section and configured to deliver air at a first pressure. A heat exchanger is connected downstream of the first tap and configured to deliver air to an aircraft fuselage. A cooling compressor is connected downstream of the heat exchanger. A high pressure feed is configured to deliver air at a second pressure which is higher than the first pressure. The cooling compressor is configured to deliver air to at least one of the plurality of rotating components. A valve assembly that can select whether air from the first tap or air from the high pressure feed is delivered to the aircraft pneumatic system.

12 Claims, 8 Drawing Sheets

Related U.S. Application Data continuation-in-part of application No. 14/695,578, filed on Apr. 24, 2015, now abandoned.

(60) Provisional application No. 62/115,578, filed on Feb. 12, 2015.

(51) Int. Cl.
  *F02C 7/18* (2006.01)
  *F02C 9/18* (2006.01)
  *F02C 7/32* (2006.01)
  *F02K 3/06* (2006.01)

(52) U.S. Cl.
  CPC ............... *F02C 9/18* (2013.01); *F02K 3/06* (2013.01); *F05D 2220/323* (2013.01); *F05D 2220/3218* (2013.01); *F05D 2260/211* (2013.01); *F05D 2260/213* (2013.01); *Y02T 50/672* (2013.01); *Y02T 50/676* (2013.01)

(58) Field of Classification Search
  CPC . F01D 9/065; F01D 5/08; F01D 25/12; F01D 25/20; F05D 2220/3218; F05D 2220/323; F05D 2260/211; F05D 2260/213; Y02T 50/676; Y02T 50/672
  See application file for complete search history.

(56) References Cited

U.S. PATENT DOCUMENTS

| | | |
|---|---|---|
| 4,254,618 A * | 3/1981 | Elovic ............... F02C 7/185 60/226.1 |
| 4,539,945 A | 9/1985 | Bosisio |
| 4,882,902 A | 11/1989 | Reigel et al. |
| 5,056,335 A | 10/1991 | Renninger et al. |
| 5,269,135 A | 12/1993 | Vermejan et al. |
| 5,305,616 A | 4/1994 | Coffinberry |
| 5,392,614 A | 2/1995 | Coffinberry |
| 5,414,992 A | 5/1995 | Glickstein |
| 5,452,573 A * | 9/1995 | Glickstein ............... F02C 6/08 60/39.183 |
| 5,498,126 A | 3/1996 | Pighetti et al. |
| 5,724,806 A | 3/1998 | Horner |
| 5,758,485 A | 6/1998 | Frutschi |
| 5,867,979 A | 2/1999 | Newton et al. |
| 5,918,458 A | 7/1999 | Coffinberry et al. |
| 6,050,079 A | 4/2000 | Durgin et al. |
| 6,065,282 A | 5/2000 | Fukue et al. |
| 6,134,880 A * | 10/2000 | Yoshinaka ............... F02C 7/143 60/226.1 |
| 6,430,931 B1 | 8/2002 | Horner |
| 6,487,863 B1 | 12/2002 | Chen et al. |
| 6,612,114 B1 | 9/2003 | Klingels |
| 6,892,523 B2 | 5/2005 | Fetescu et al. |
| 7,237,386 B2 | 7/2007 | Hoffmann et al. |
| 7,246,484 B2 | 7/2007 | Giffin, III et al. |
| 7,284,377 B2 | 10/2007 | Joshi et al. |
| 7,306,424 B2 | 12/2007 | Romanov et al. |
| 7,334,412 B2 | 2/2008 | Tiemann |
| 7,347,637 B2 | 3/2008 | Kubo et al. |
| 7,500,365 B2 | 3/2009 | Suciu et al. |
| 7,552,591 B2 | 6/2009 | Bart et al. |
| 7,698,884 B2 | 4/2010 | Maguire et al. |
| 7,765,788 B2 | 8/2010 | Schwarz |
| 7,823,389 B2 | 11/2010 | Seitzer et al. |
| 7,882,691 B2 | 2/2011 | Lemmers, Jr. et al. |
| 7,886,520 B2 | 2/2011 | Stretton et al. |
| 8,015,828 B2 | 9/2011 | Moniz et al. |
| 8,037,686 B2 | 10/2011 | Lasker |
| 8,087,249 B2 | 1/2012 | Ottaviano et al. |
| 8,181,443 B2 | 5/2012 | Rago |
| 8,307,662 B2 | 11/2012 | Turco |
| 8,350,398 B2 | 1/2013 | Butt |
| 8,397,487 B2 | 3/2013 | Sennoun et al. |
| 8,402,742 B2 | 3/2013 | Roberge et al. |
| 8,434,997 B2 | 5/2013 | Pinero et al. |
| 8,511,967 B2 | 8/2013 | Suciu et al. |
| 8,522,529 B2 | 9/2013 | Martinou et al. |
| 8,572,982 B2 | 11/2013 | Tiemann |
| 8,602,717 B2 * | 12/2013 | Suciu ............... F02C 7/14 415/1 |
| 8,621,871 B2 | 1/2014 | McCune et al. |
| 8,727,703 B2 | 5/2014 | Laurello et al. |
| 8,776,952 B2 | 7/2014 | Schwarz et al. |
| 8,814,502 B2 | 8/2014 | Eleftheriou |
| 8,876,465 B2 | 11/2014 | Stretton |
| 8,961,108 B2 | 2/2015 | Bergman et al. |
| 9,234,481 B2 | 1/2016 | Suciu et al. |
| 9,239,005 B2 | 1/2016 | Strecker et al. |
| 9,243,563 B2 | 1/2016 | Lo |
| 9,255,492 B2 | 2/2016 | Bacic |
| 9,297,391 B2 | 3/2016 | Rued et al. |
| 9,422,063 B2 | 8/2016 | Diaz |
| 9,429,072 B2 | 8/2016 | Diaz et al. |
| 9,580,180 B2 | 2/2017 | Jonqueres et al. |
| 9,765,700 B2 | 9/2017 | Mackin et al. |
| 9,828,870 B2 | 11/2017 | Ho |
| 9,850,819 B2 | 12/2017 | Suciu et al. |
| 9,856,793 B2 | 1/2018 | Zelesky et al. |
| 2003/0046938 A1 | 3/2003 | Mortzheim et al. |
| 2004/0088995 A1 | 5/2004 | Reissig |
| 2005/0172612 A1 | 8/2005 | Yamanaka et al. |
| 2007/0022735 A1 | 2/2007 | Henry et al. |
| 2007/0213917 A1 | 9/2007 | Bruno et al. |
| 2007/0245738 A1 | 10/2007 | Stretton et al. |
| 2008/0028763 A1 | 2/2008 | Schwarz et al. |
| 2008/0230651 A1 | 9/2008 | Porte |
| 2008/0253881 A1 | 10/2008 | Richards |
| 2009/0007567 A1 | 1/2009 | Porte et al. |
| 2009/0090096 A1 | 4/2009 | Sheridan |
| 2009/0145102 A1 | 6/2009 | Roberge et al. |
| 2009/0188232 A1 * | 7/2009 | Suciu ............... B64D 27/18 60/39.83 |
| 2009/0196736 A1 | 8/2009 | Sengar et al. |
| 2009/0226297 A1 | 9/2009 | Yanagi et al. |
| 2009/0272120 A1 | 11/2009 | Tiemann |
| 2010/0005810 A1 * | 1/2010 | Jarrell ............... F02C 3/107 60/792 |
| 2010/0043396 A1 | 2/2010 | Coffinberry |
| 2010/0154434 A1 | 6/2010 | Kubota et al. |
| 2011/0036066 A1 | 2/2011 | Zhang et al. |
| 2011/0088405 A1 | 4/2011 | Turco |
| 2011/0120083 A1 | 5/2011 | Giffin et al. |
| 2011/0247344 A1 * | 10/2011 | Glahn ............... F01D 5/081 60/782 |
| 2012/0067055 A1 | 3/2012 | Held |
| 2012/0102915 A1 | 5/2012 | Baltas |
| 2012/0159961 A1 | 6/2012 | Krautheim et al. |
| 2012/0180509 A1 | 7/2012 | DeFrancesco ............... B64D 13/08 62/172 |
| 2012/0216545 A1 * | 8/2012 | Sennoun ............... B64D 13/06 60/772 |
| 2013/0000317 A1 * | 1/2013 | Berryann ............... F01D 19/00 60/778 |
| 2013/0036747 A1 | 2/2013 | Fuchs et al. |
| 2013/0040545 A1 * | 2/2013 | Finney ............... B64D 13/06 454/71 |
| 2013/0067928 A1 | 3/2013 | Chao et al. |
| 2013/0098059 A1 | 4/2013 | Suciu et al. |
| 2013/0145744 A1 | 6/2013 | Lo et al. |
| 2013/0145774 A1 | 6/2013 | Duong et al. |
| 2013/0186102 A1 | 7/2013 | Lo |
| 2013/0187007 A1 * | 7/2013 | Mackin ............... F02C 6/08 244/134 R |
| 2013/0192258 A1 | 8/2013 | Kupratis et al. |
| 2013/0199156 A1 * | 8/2013 | Ress, Jr. ............... F02C 3/113 60/224 |
| 2013/0239583 A1 | 9/2013 | Suciu et al. |
| 2013/0318983 A1 * | 12/2013 | Zhou ............... F02C 6/08 60/772 |
| 2013/0319002 A1 | 12/2013 | Sidelkovskiy et al. |
| 2014/0020506 A1 | 1/2014 | Duong |

(56) References Cited

U.S. PATENT DOCUMENTS

| | | | |
|---|---|---|---|
| 2014/0137417 A1 | 5/2014 | Silberberg et al. | |
| 2014/0196469 A1 | 7/2014 | Finney et al. | |
| 2014/0208768 A1* | 7/2014 | Bacic | F01D 5/082 60/782 |
| 2014/0230444 A1 | 8/2014 | Hao et al. | |
| 2014/0250898 A1 | 9/2014 | Mackin et al. | |
| 2014/0260326 A1* | 9/2014 | Schwarz | F02K 3/06 60/805 |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2016/0369705 A1 | 12/2016 | Mackin et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |
| 2017/0306847 A1 | 10/2017 | Suciu et al. | |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 A2 | 4/2013 |
| EP | 2604825 | 6/2013 |
| EP | 2733322 | 5/2014 |
| EP | 2865981 | 4/2015 |
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.

U.S. Appl. No. 15/232,101.

U.S. Appl. No. 14/964,984.

U.S. Appl. No. 14/967,446.

U.S. Appl. No. 15/069,197.

U.S. Appl. No. 15/269,014.

U.S. Appl. No. 15/373,072.

European Search Report for European Application No. 16166707.6 dated Sep. 26, 2016.

European Search Report for European Application No. 16166724.1 dated Sep. 26, 2016.

European Search Report for European Patent Application No. 16154635.3 dated Jul. 6, 2016.

European Search Report for European Application No. 16155316.9 dated Jun. 30, 2016.

European Search Report for Application No. 16170021.6 dated Oct. 11, 2016.

European Search Report for Application No. 16174862.9 dated Nov. 7, 2016.

European Search Report for European Application No. 16175531.9 dated Nov. 15, 2016.

European Search Report for European Application No. 16175533.5 dated Nov. 15, 2016.

European Search Report for European Application No. 16175552.5 dated Nov. 17, 2016.

European Search Report for European Application No. 16175760.4 dated Nov. 16, 2016.

European Search Report for Application No. 16178207.3 dated Nov. 21, 2016.

European Search Report for European Application No. 16202876.5 dated Apr. 24, 2017.

European Search Report for EP Application No. 17160816.9 dated Jul. 21, 2017.

European Search Report for European Application No. 16180657.5 dated Dec. 16, 2016.

* cited by examiner

INTERCOOLED COOLING AIR

CROSS-REFERENCE TO RELATED APPLICATION

This application is a continuation-in-part of U.S. patent application Ser. No. 14/804,534, filed Jul. 21, 2015, which is a continuation-in-part of U.S. patent application Ser. No. 14/695,578 (filed on Apr. 24, 2015 and entitled "Intercooled Cooling Air") and claims priority to U.S. Provisional Patent Application No. 62/115,578, filed Feb. 12, 2015.

BACKGROUND

This application relates to improvements in providing cooling air from a compressor section to a turbine section in a gas turbine engine.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

It is known to provide cooling air from the compressor to the turbine section to lower the operating temperatures in the turbine section and improve overall engine operation. Typically, air from the high compressor discharge has been tapped, passed through a heat exchanger, which may sit in the bypass duct and then delivered into the turbine section. The air from the downstream most end of the compressor section is at elevated temperatures.

SUMMARY

In a featured embodiment, a gas turbine engine includes a plurality of rotating components housed within a compressor section and a turbine section. A first tap is connected to the compressor section and configured to deliver air at a first pressure. A heat exchanger is connected downstream of the first tap and configured to deliver air to an aircraft fuselage. A cooling compressor is connected downstream of the heat exchanger. A high pressure feed is configured to deliver air at a second pressure which is higher than the first pressure. The cooling compressor is configured to deliver air to at least one of the plurality of rotating components. A valve assembly that can select whether air from the first tap or air from the high pressure feed is delivered to the aircraft pneumatic system.

In another embodiment according to the previous embodiment, a mixer is provided downstream of the cooling compressor to receive air from a second tap to mix with the air downstream of the cooling compressor.

In another embodiment according to any of the previous embodiments, air temperatures at the high pressure feed may be greater than or equal to 1350° F.

In another embodiment according to any of the previous embodiments, the high pressure feed is connected to the compressor section, and connected into a line connected to the first tap, and at a location upstream of the heat exchanger, and the valve assembly selectively modulating between air in the first tap and high pressure feed being passed to the heat exchanger.

In another embodiment according to any of the previous embodiments, the high pressure feed is connected to the compressor section and connected to a line downstream of the heat exchanger. The valve assembly modulates airflow from the first tap, downstream of the heat exchanger, and the high pressure feed, for being passed to the aircraft pneumatic system.

In another embodiment according to any of the previous embodiments, the high pressure feed is downstream of the cooling compressor, and is connected to a line downstream of the heat exchanger. The valve assembly selectively modulates between air downstream of the heat exchanger, but not having passed through the cooling compressor, and air having passed through the cooling compressor for being delivered to the aircraft pneumatic system.

In another embodiment according to any of the previous embodiments, the heat exchanger is positioned in a bypass duct between an outer fan housing an inner core housing.

In another embodiment according to any of the previous embodiments, the heat exchanger is positioned within a pylon which selectively connects the gas turbine engine to an associated aircraft.

In another embodiment according to any of the previous embodiments, the pylon having openings in an upstream end to allow air to pass across the heat exchanger to cool the heat exchanger.

In another embodiment according to any of the previous embodiments, the heat exchanger is positioned in an upper bifurcation connecting the outer fan housing to the inner core housing.

In another embodiment according to any of the previous embodiments, there are openings at an upstream end of the upper bifurcation to allow bypass duct to pass across the heat exchanger to cool the heat exchanger.

In another embodiment according to any of the previous embodiments, the valve is a single valve.

In another embodiment according to any of the previous embodiments, the high pressure feed is connected to the compressor section, and to a line connected to the first tap, and at a location upstream of the heat exchanger. The valve assembly selectively modulates between air in the first tap and the high pressure feed being passed to the heat exchanger.

In another embodiment according to any of the previous embodiments, the high pressure feed is connected to the compressor section, and to a line downstream of the heat exchanger. The valve assembly modulates airflow from the first tap, downstream of the heat exchanger, and the high pressure feed, for being passed to the aircraft pneumatic system.

In another embodiment according to any of the previous embodiments, the high pressure feed is downstream of the cooling compressor, and is connected to a line downstream of the heat exchanger. The valve assembly selectively modulates between air downstream of the heat exchanger, but not having passed through the cooling compressor, and air having passed through the cooling compressor for being delivered to said aircraft pneumatic system.

In another embodiment according to any of the previous embodiments, an air cycle machine is positioned between a line leading to the aircraft pneumatic system and an aircraft cabin.

In another embodiment according to any of the previous embodiments, the heat exchanger is positioned in a bypass duct between an outer fan housing an inner core housing.

In another embodiment according to any of the previous embodiments, the heat exchanger is positioned within a pylon which selectively connects the gas turbine engine to an associated aircraft.

In another embodiment according to any of the previous embodiments, the pylon has openings in an upstream end to allow air to pass across the heat exchanger to cool the heat exchanger.

In another featured embodiment, a gas turbine engine includes a main compressor section having a high pressure compressor with a downstream discharge and a low pressure compressor providing at least one upstream discharge. A turbine section has at least two turbine rotors, with a first being at a higher pressure than a second. A tap taps air from at least one of the more upstream locations in the compressor section, passing the tapped air through a heat exchanger and then to a cooling compressor. The cooling compressor compresses air downstream of the heat exchanger, and delivers air to the first turbine rotor. The bull gear also drives an accessory gearbox. A gear ratio multiplier is included such that the impeller rotates at a faster speed than the tower shaft.

These and other features may be best understood from the following drawings and specification.

DETAILED DESCRIPTION

Figure 1:
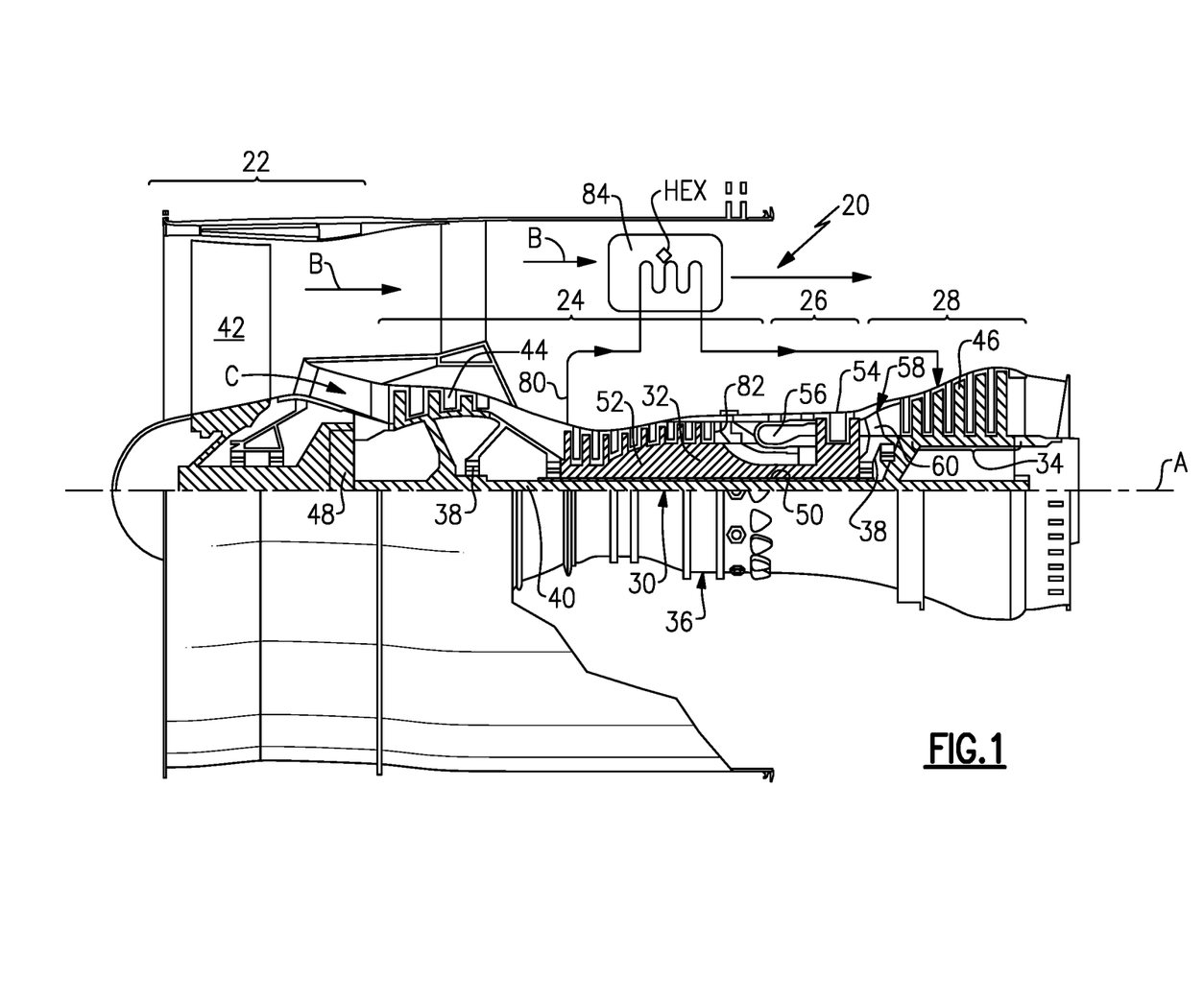
FIG. 1 schematically shows an embodiment of a gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher overall pressure ratios. By achieving higher overall pressure ratios, increased levels of performance and efficiency may be achieved. However, challenges are raised in that the parts and components associated with a high pressure turbine require additional cooling air as the overall pressure ratio increases.

The example engine 20 utilizes air bleed 80 from an upstream portion of the compressor section 24 for use in cooling portions of the turbine section 28. The air bleed is from a location upstream of the discharge 82 of the compressor section 24. The bleed air passes through a heat exchanger 84 to further cool the cooling air provided to the turbine section 28. The air passing through heat exchanger 84 is cooled by the bypass air B. That is, heat exchanger 84 is positioned in the path of bypass air B.

Figure 2:
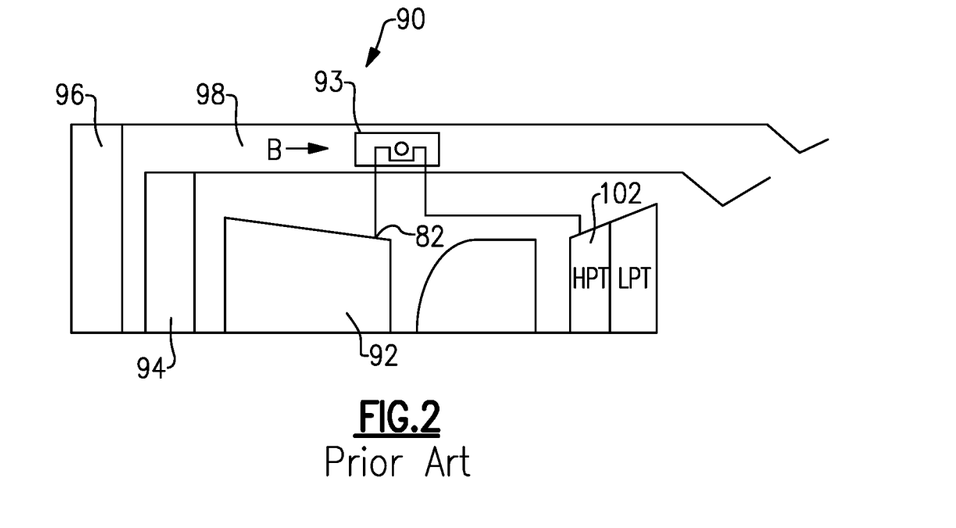
FIG. 2 shows a prior art engine.

A prior art approach to providing cooling air is illustrated in FIG. 2. An engine 90 incorporates a high pressure compressor 92 downstream of the low pressure compressor 94. As known, a fan 96 delivers air into a bypass duct 98 and into the low pressure compressor 94. A downstream most point, or discharge 82 of the high pressure compressor 92 provides bleed air into a heat exchanger 93. The heat exchanger is in the path of the bypass air in bypass duct 98, and is cooled. This high pressure high temperature air from location 82 is delivered into a high pressure turbine 102.

The downstream most point 82 of the high pressure compressor 82 is known as station 3. The temperature T3 and pressure P3 are both very high.

In future engines, T3 levels are expected to approach greater than or equal to 1350° F. Current heat exchanger technology is becoming a limiting factor as they are made of materials, manufacturing, and design capability which have difficulty receiving such high temperature and pressure levels.

Figure 3:
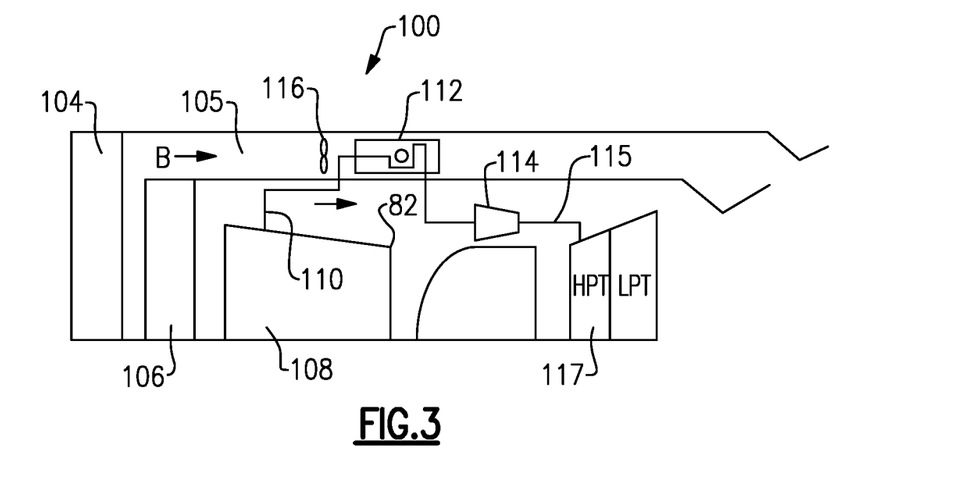
FIG. 3 shows one example engine.

FIG. 3 shows an engine 100 coming within the scope of this disclosure. A fan 104 may deliver air B into a bypass duct 105 and into a low pressure compressor 106. High pressure compressor 108 is positioned downstream of the low pressure compressor 106. A bleed 110 taps air from a location upstream of the downstream most end 82 of the high pressure compressor 108. This air is at temperatures and pressures which are much lower than T3/P3. The air tapped at 110 passes through a heat exchanger 112 which sits in the bypass duct 105 receiving air B. Further, the air from the heat exchanger 112 passes through a compressor 114, and then into a conduit 115 leading to a high turbine 117. This structure is all shown schematically.

Since the air tapped at point 110 is at much lower pressures and temperatures than the FIG. 2 prior art, currently available heat exchanger materials and technology may be utilized. This air is then compressed by compressor 114 to a higher pressure level such that it will be able to flow into the high pressure turbine 117.

An auxiliary fan 116 may be positioned upstream of the heat exchanger 112 as illustrated. The main fan 104 may not provide sufficient pressure to drive sufficient air across the heat exchanger 112. The auxiliary fan will ensure there is adequate air flow in the circumferential location of the heat exchanger 112.

In one embodiment, the auxiliary fan may be variable speed, with the speed of the fan varied to control the temperature of the air downstream of the heat exchanger 112. As an example, the speed of the auxiliary fan may be varied based upon the operating power of the overall engine.

While cooling of the turbine section is illustrated, it may be that the compressor section is cooled instead. In embodiments both are cooled. Generally, the disclosure extends to cooling at least one rotating component.

Figure 4:
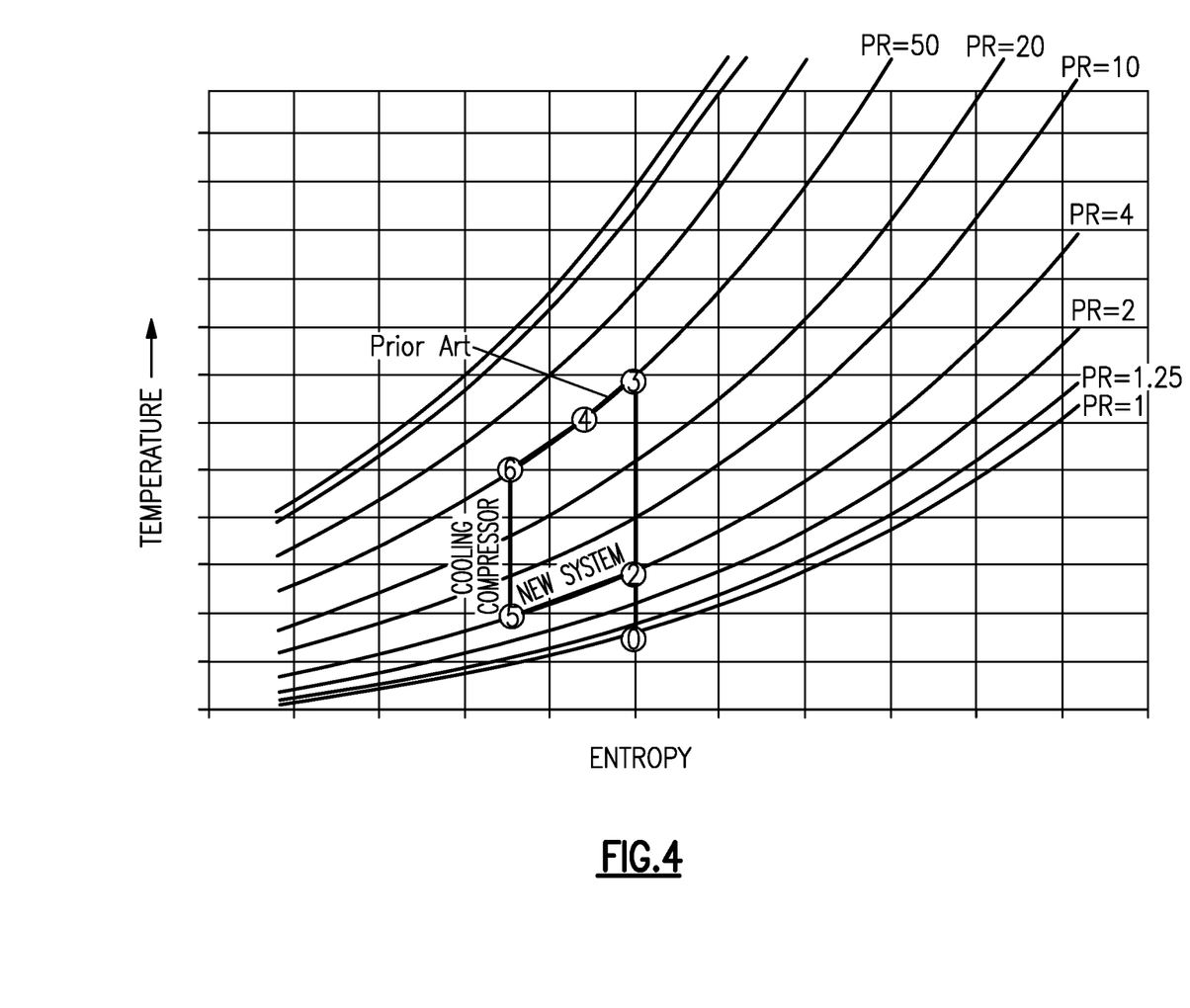
FIG. 4 is a graph illustrating increasing temperatures of a tapped air against the work required.

Referring to FIG. 4, a temperature/entropy diagram illustrates that a lower level of energy is spent to compress air of a lower temperature to the desired P3 pressure level. Cooler air requires less work to compress when compared to warmer air so the device is smaller and will be more efficient. Accordingly, the work required to raise the pressure of the air drawn from an early stage of the compressor section is less than if the air were compressed to the desired pressure within the compressor section. Therefore, high pressure air at P3 levels equivalent, or higher, than the main compressor can be obtained at significantly lower temperatures than T3. As shown in FIG. 4, to reach a particular pressure ratio, 50 for example, the prior system would move from point 2 to point 3, with a dramatic increase in temperature. However, the disclosed or new system moves from point 2 to point 5 through the heat exchanger, and the cooling compressor then compresses the air up to point 6. As can be appreciated, point 6 is at a much lower temperature.

Figure 5:
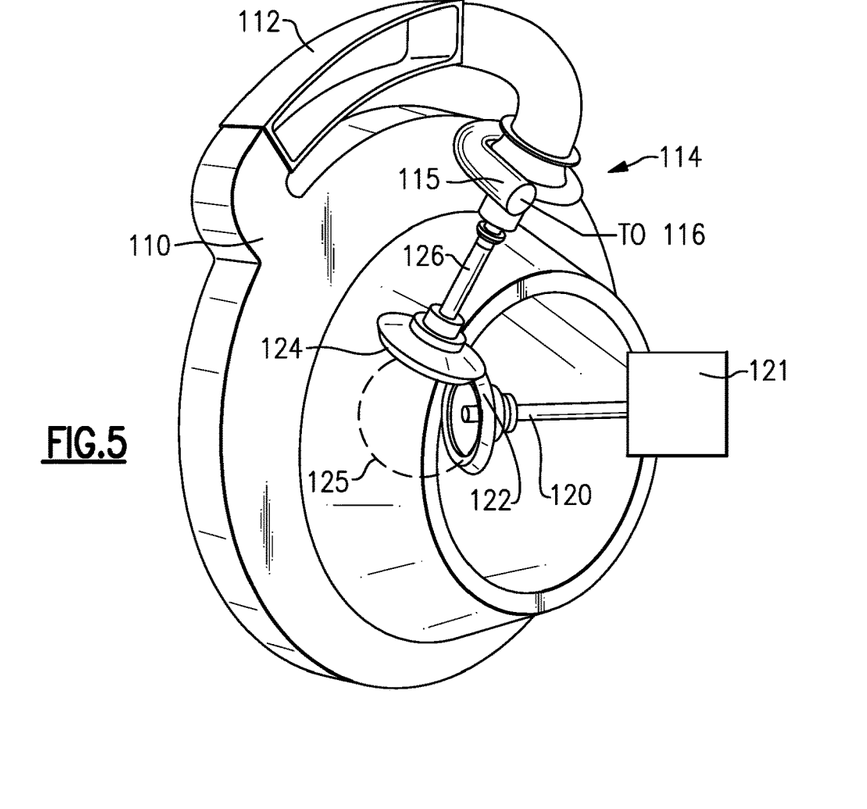
FIG. 5 shows a detail of an example of an engine.

FIG. 5 shows a detail of compressor 114 having an outlet into conduit 115. In one embodiment, a primary tower shaft 120 drives an accessory gearbox 121 in order to take power off of a main engine shaft. The shaft 126 drives a compressor rotor within the cooling compressor 114. The shafts 120 and 126 may be driven by a bull gear 125 driven by a turbine rotor, and in one example, with a high pressure compressor rotor.

Figure 6:
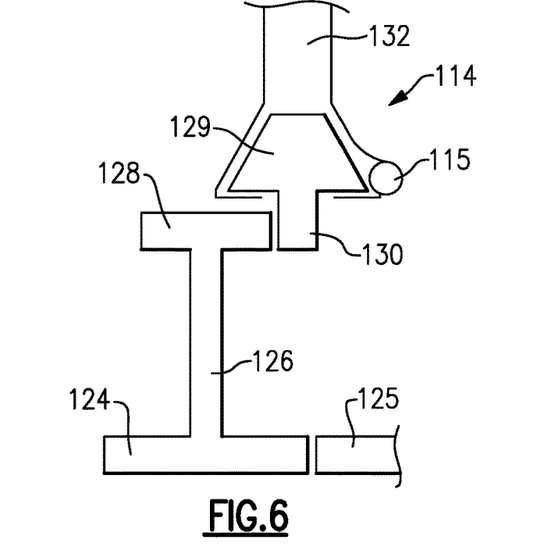
FIG. 6 shows a further detail of the example engine of FIG. 5.

FIG. 6 shows an example wherein a gear 128 is driven by the shaft 126 to, in turn, drive a gear 130 which drives a compressor impeller 129. An input 132 to the compressor impeller 129 supplies the air from the tap 110. The air is compressed and delivered into the outlet conduit 115. The interacting gears in FIG. 6 depict schematically that the cooling compressor's speed is much higher than the bull gear's speed, which is equivalent to the main engine's shaft speed. In embodiments this speed increase is at least two times and up to ten times. In one embodiment the cooling compressor's speed is 6 times that of the highest main engine shaft speed.

Details of the engine, as set forth above, may be found in co-pending U.S. patent application Ser. No. 14/695,578, which is incorporated herein by reference in its entirety.

Figure 7:
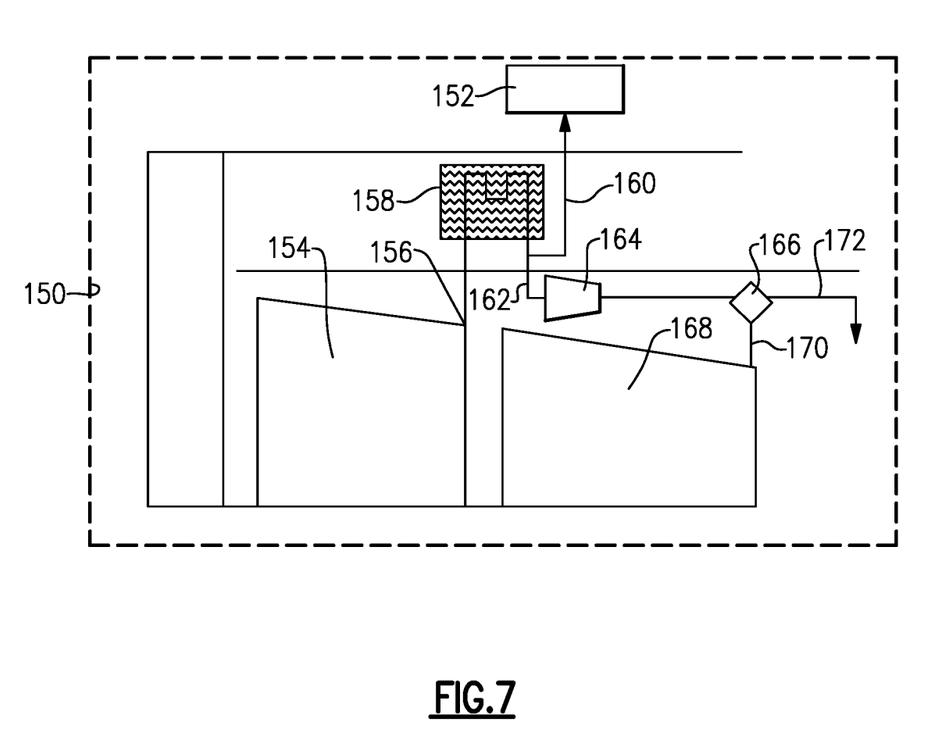
FIG. 7 schematically shows a further embodiment.

As shown in FIG. 7, an embodiment uses the same heat exchanger for two purposes: for cooling at least the turbine section and supplying an aircraft environmental control system. An aircraft 150 has an aircraft cabin 152 which must be supplied by air. As known, a lower pressure compressor 154 has air tapped 156 (as above) and passed through a heat exchanger 158. In this embodiment, the heat exchanger 158 is an existing aircraft pre-cooler which is currently used on engines to receive compressor bleed air, and cool it down to less than 450° F. This air is then delivered to the cabin environmental control system 152. In one scenario, the aircraft is on the ground and ready for takeoff; the flow to the system designated 152 is not large owing to the fact that the aircraft needs some ventilation but no pressurization at this point and the flow from the heat exchanger is primarily to the turbine at this point. Later, when the aircraft requires more air conditioning flow and/or cabin pressurization the proportion of the flow going to the airframe may increase.

Note, that the air actually passes into an aircraft pneumatic system. Some of the air does pass to the aircraft cabin, but some also goes for wing anti-icing and pressurizing cargo areas, etc. Thus, for purposes of the claims, it will be noted that the air is delivered to an aircraft pneumatic system.

Air 160 downstream of the heat exchanger 158 travels to the aircraft cabin 152. Another branch 162 downstream of the heat exchanger 158 passes to the cooling compressor 164. Cooling compressor 164 may deliver air into a mixer 166 which receives air from a higher pressure compressor 168 at tap 170. This mixing is optional. Downstream of the mixer 166, the air is delivered at 172 to the turbine (again, similar to that disclosed above).

Figure 8:
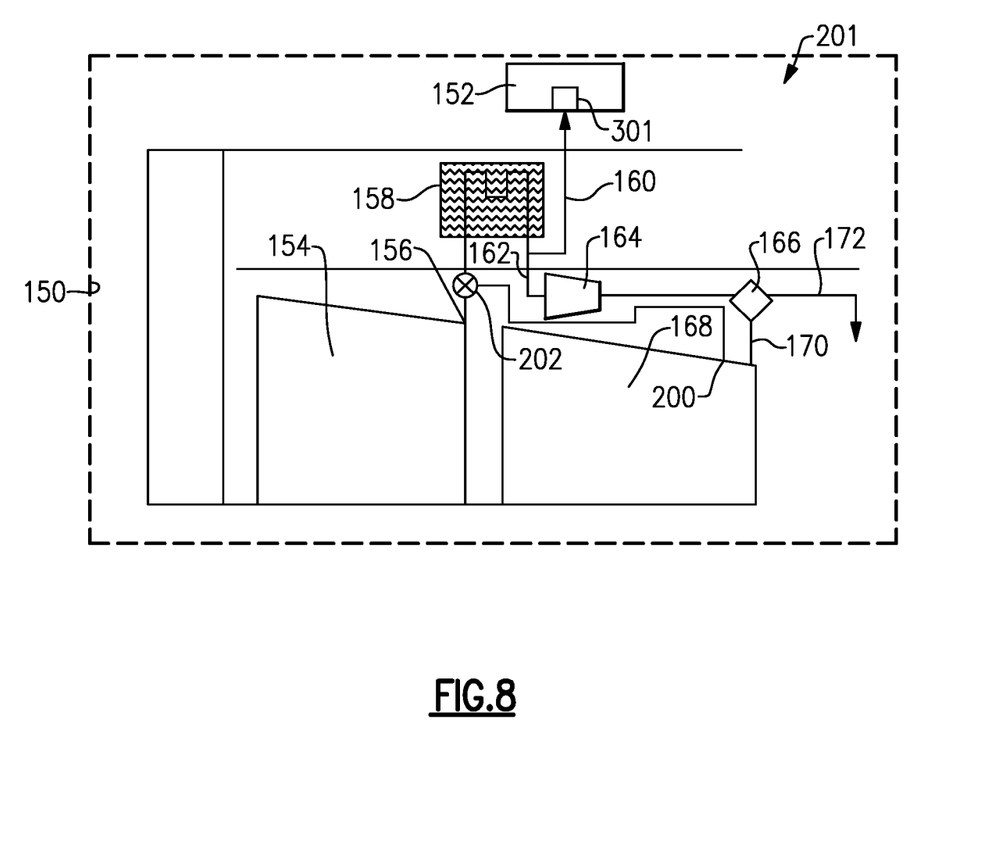
FIG. 8 shows another embodiment.

As has been mentioned, the above embodiments are shown somewhat schematically. FIG. 8 shows an embodiment 201 wherein a second tap 200 is taken from a higher pressure location than 156, perhaps within the high pressure compressor 168. A valve 202 can modulate the flow between tap 156 and tap 200 to heat exchanger 158. It should be noted that tap 200 could be at an even higher pressure location.

The tap 156 is preferably utilized during high power operation, such as take-off and climb, while the air from tap 200 can be utilized when the engine 201 is at ground idle, flight idle, or other fairly low power conditions.

As an example, should one engine need to be shut down at high altitude and the engine 201 is still operating, the tap 200 could be used to provide for cabin pressurization. Further, if the aircraft is at a service ceiling, then the tap 200 may be utilized to provide the necessary cabin pressure, even though both engines are operating. A controller for the valve 202 is programmed to achieve these selections. In addition, the tap 200 can be high pressure compressor discharge static pressure, or from the diffuser case around the combustor. Generically, all of these locations could be referred to as a tap location higher than the more upstream location where the tap 156 is taken.

Figure 9:
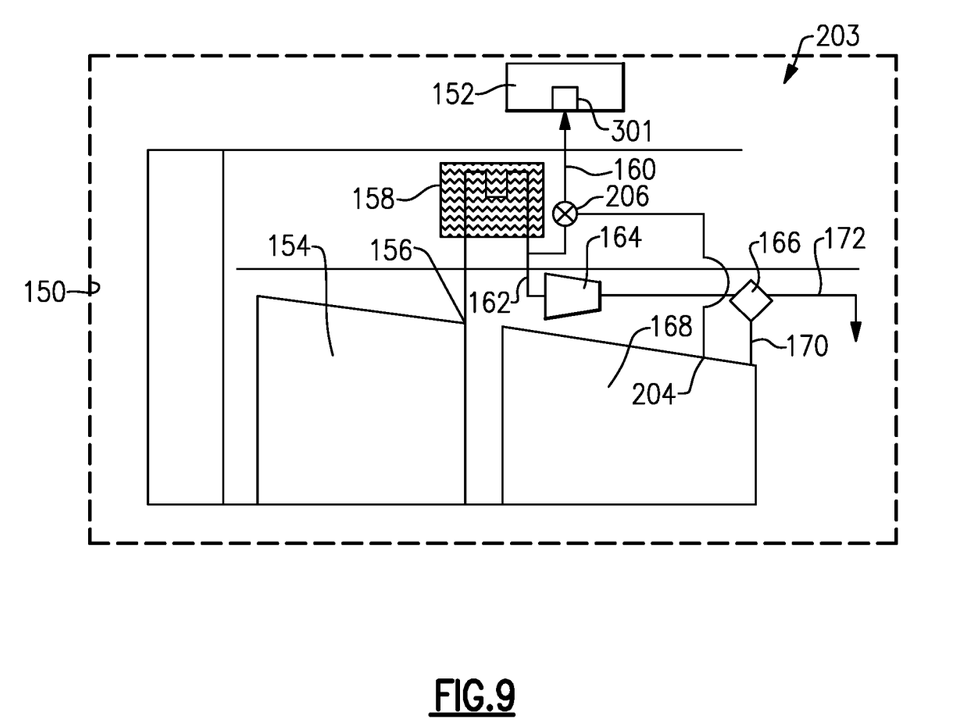
FIG. 9 shows yet another embodiment.

FIG. 9 shows another embodiment 203. In this embodiment, the tap 204 may be taken from any location as mentioned above with regard to the tap 200. However, the tap 204 here bypasses the heat exchanger 158 if certain conditions can be met by the selection, namely that the consideration of the entire envelope of the engine and aircraft's operation and the operation of the selection valve are such that the bleed temperature never exceeds a predetermined temperature (say about 425 degrees Fahrenheit) to keep hot air out of wing. There may be other considerations with a different temperature limit such as the structural allowable temperatures of a wing component, say as an organic matrix composite material. Instead, the tap 204 communicates with a valve 206 which selects between the air delivered from the heat exchanger 158 and tap 204, to be sent to the aircraft cabin 152. Again, the valve 206, and its associated control, will predominantly utilize air from tap 156 at higher power operation, and predominantly air from the tap 204 at lower power operation.

Figure 10:
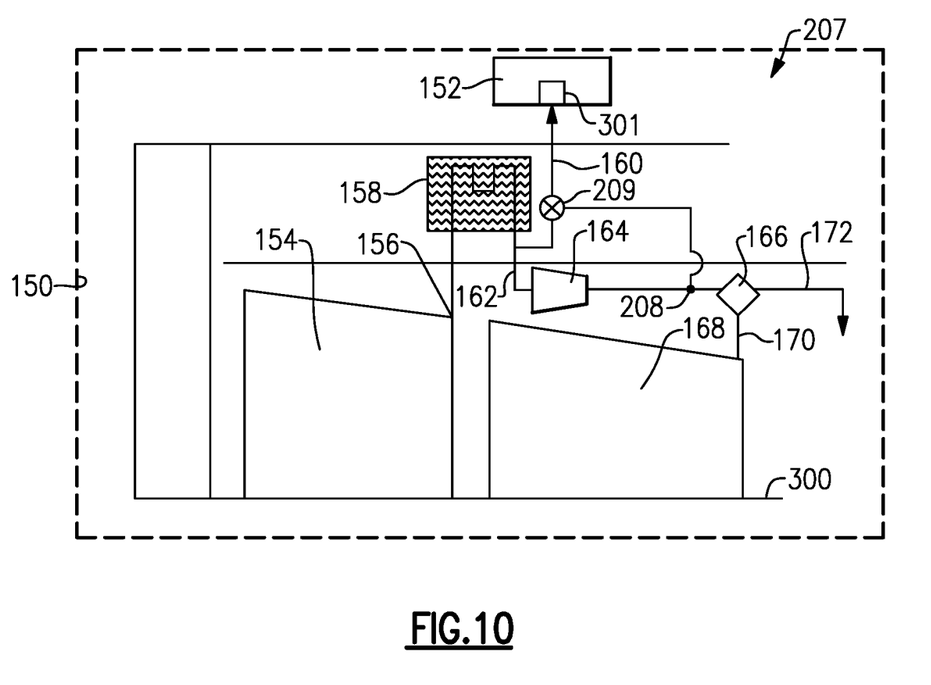
FIG. 10 shows yet another embodiment.

FIG. 10 shows another embodiment 207. Here, a higher pressure tap 208 is taken from a location downstream of the cooling compressor 164, and passes to a valve 209. Valve 209 is controlled to select between the air from tap 156, downstream of the heat exchanger 158, and air from the tap 208.

This embodiment may be utilized should a designer determine that it would be beneficial to set the outlet pressure of the cooling compressor to be higher than the source 200 or 204 from the above embodiment. One example of such desirable scenario would where the aircraft service ceiling is at a very high altitude, say 45,000 ft, that is above a more conventional altitude of say, 42,000 ft for an operational advantage involving passing around thunderstorms and the need to find smoother air for passenger safety and comfort that is commonly referred to as "clear air turbulence". Here if it is determined that the main engine's compressor is inadequate to support safe operation at the increased altitude when the designer considers multiple engine and environment control system failure occurrences such as engine-out flight with a twin engine aircraft where the remaining engine is set at idle to initiate an emergency descent.

The valve assemblies show in FIGS. 8-10 could be single valves or dual valves. If dual, the valve on the lower pressure line could be a check valve, with the other line receiving a controlled valve. Alternatively, both valves could be controlled.

Figure 11:
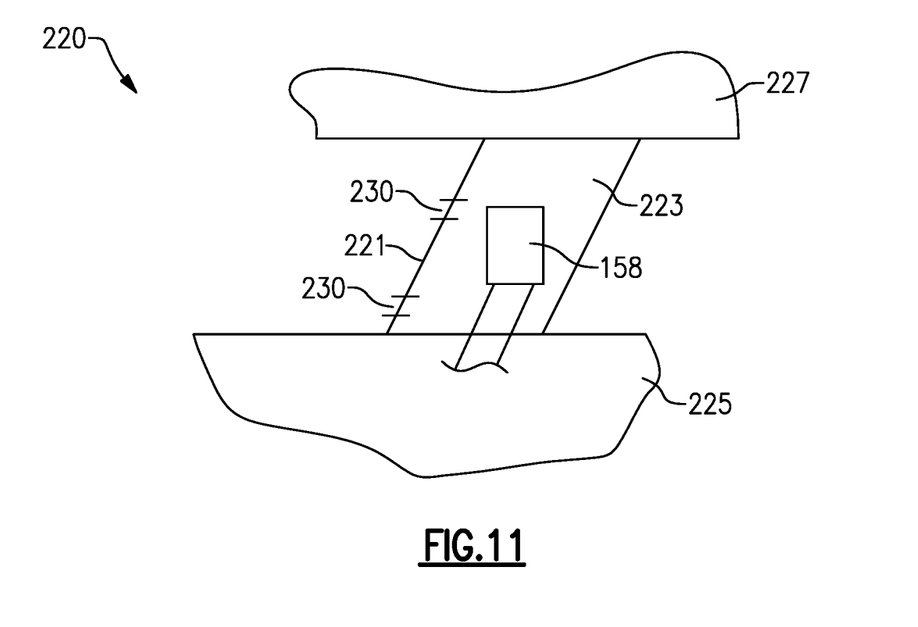
FIG. 11 shows a potential location for a heat exchanger.

FIG. 11 relates to the location of the heat exchanger 158. The heat exchanger 158 in all embodiments may be located vertically above an engine rotational center line 300 (see FIG. 10). This facilitates service.

In the specific embodiment 220 illustrated in FIG. 11, the heat exchanger 158 is located in one of an upper bifurcation or pylon 223 which selectively connects a radially inner member 225 to a radially outer member 227 of the engine's nacelle. In one embodiment, the outer member 227 may be the aircraft outer barrel surrounding the fan duct, the element 223 may be a pylon, and the element 225 may be the inner barrel surround the core of the engine. In another embodiment, the inner element 222 may be an inner core housing, the element 223 may be an upper bifurcation, and the outer element 227 may be an outer fan housing.

At any rate, a leading edge 221 of the element 223 has openings shown schematically at 230 to allow cooling air to pass over the heat exchanger 158.

Overall these systems are large in size and packaging can be challenging such that it may be desirable to located the cooling compressor on the accessory gearbox as was described earlier and to place the heat exchanger somewhat above the engine horizontal centerline such that the fan air can enter the heat and the plumbing to the aircraft environmental control system can exit directly up through the upper bifurcation and enter the wing without taking up an inordinate amount of the limited space in the core cowling In all of these embodiments, it should be understood that the "aircraft cabin" 152 is actually a much more complicated system and might contain an air cycle machine 301, as illustrated, and other associated systems.

By utilizing the existing heat exchanger 158, a separate heat exchanger is not required to provide the inter-cooled air. This may require that the existing aircraft pre-cooler or heat exchanger be slightly upsized. However, the combination would eliminate the requirement of an additional heat exchanger, and provide freedom with regard to packaging, and reduction of both weight and cost.

A gas turbine engine could be said to include a plurality of rotating components (52 and/or 54) housed within a compressor section and a turbine section. A first tap 156 connected to the compressor section and configured to deliver air at a first pressure. A heat exchanger 158 is connected downstream of the first tap and configured to deliver air 160 to an aircraft fuselage. A cooling compressor 164 is connected downstream of the heat exchanger. A high pressure feed (200/204/208) is configured to deliver air at a second pressure which is higher than the first pressure. The cooling compressor is configured to deliver air to at least one of the plurality of rotating components. A valve assembly (202/206/209) can select whether air from the first tap or air from the high pressure feed is delivered to the aircraft pneumatic system.

In the embodiment of FIG. 8 the high pressure feed is the air downstream of tap 200, and the valve is valve 202. In the embodiment of FIG. 9 the high pressure feed is the air downstream of the tap 204, and the valve is valve 206. In the embodiment of FIG. 10 the high pressure feed is downstream of the tap 208, and the valve is valve 209.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
    a plurality of rotating components housed within a compressor section and a turbine section;
    a first tap connected to said compressor section and configured to deliver air at a first pressure;
    a heat exchanger connected downstream of said first tap and configured to deliver air to an aircraft fuselage;
    a cooling compressor connected downstream of said heat exchanger;
    a high pressure feed configured to deliver air at a second pressure which is higher than said first pressure;
    said cooling compressor is configured to deliver air to at least one of said plurality of rotating components;
    a valve, said first tap connected to said valve downstream of said heat exchanger and upstream of said cooling compressor, and said high pressure feed also being connected to said valve such that said valve can select whether air from said first tap or air from said high pressure feed is delivered to the aircraft pneumatic system; and
    wherein said high pressure feed is tapped downstream of said cooling compressor, and is connected to a line downstream of said heat exchanger, and said valve selectively modulating between air downstream of said heat exchanger, but not having passed through said cooling compressor, and air having passed through said cooling compressor for being delivered to said aircraft pneumatic system.

2. The gas turbine engine as set forth in claim 1, wherein said heat exchanger is positioned in a bypass duct between an outer fan housing an inner core housing.

3. The gas turbine engine as set forth in claim 1, wherein said heat exchanger is positioned within a pylon which selectively connects the gas turbine engine to an associated aircraft.

4. The gas turbine engine as set forth in claim 3, wherein said pylon having openings in an upstream end to allow air to pass across said heat exchanger to cool said heat exchanger.

5. The gas turbine engine as set forth in claim 1, wherein said heat exchanger is positioned in an upper bifurcation connecting the outer fan housing to the inner core housing.

6. The gas turbine engine as set forth in claim 5, wherein there are openings at an upstream end of said upper bifurcation to allow bypass duct to pass across the heat exchanger to cool the heat exchanger.

7. The gas turbine engine as set forth in claim 1, wherein said valve is a single valve.

8. A gas turbine engine comprising:
    a plurality of rotating components housed within a compressor section and a turbine section;
    a first tap connected to said compressor section and configured to deliver air at a first pressure;
    a heat exchanger connected downstream of said first tap and configured to deliver air to an aircraft fuselage;
    a cooling compressor connected downstream of said heat exchanger;
    a high pressure feed configured to deliver air at a second pressure which is higher than said first pressure;
    said cooling compressor is configured to deliver air to at least one of said plurality of rotating components;
    a valve, said first tap, connected to said valve downstream of said heat exchanger, and upstream of said cooling compressor, and said high pressure feed also being connected to said valve; and
    wherein said high pressure feed connected to said compressor section, and to a line downstream of said heat exchanger and said valve modulating airflow from said first tap, downstream of said heat exchanger, and said high pressure feed, for being passed to said aircraft pneumatic system.

9. The gas turbine engine as set forth in claim 8, wherein an air cycle machine is positioned between a line leading to the aircraft pneumatic system and an aircraft cabin.

10. The gas turbine engine as set forth in claim 8, wherein said heat exchanger is positioned in a bypass duct between an outer fan housing an inner core housing.

11. The gas turbine engine as set forth in claim 8, wherein said heat exchanger is positioned within a pylon which selectively connects the gas turbine engine to an associated aircraft.

12. The gas turbine engine as set forth in claim 11, wherein said pylon having openings in an upstream end to allow air to pass across said heat exchanger to cool said heat exchanger.

\* \* \* \* \*